US012134711B2

(12) United States Patent
Flores-Vasquez et al.

(10) Patent No.: US 12,134,711 B2
(45) Date of Patent: Nov. 5, 2024

(54) COMPOSITIONS INCLUDING PVC OR CPVC (71) Applicant: AdvanSix Resins & Chemicals LLC, Parsippany, NJ (US)

(72) Inventors: Jaime A. Flores-Vasquez, Glen Allen, VA (US); Edward Asirvatham, Chatham, NJ (US); Karttikay Moudgil, Johns Creek, GA (US)

(73) Assignee: AdvanSix Resins & Chemicals LLC, Parsippany, NJ (US)

( * ) Notice: Subject to any disclaimer, the term of this patent is extended or adjusted under 35 U.S.C. 154(b) by 350 days.

(21) Appl. No.: 17/298,454

(22) PCT Filed: Dec. 9, 2019

(86) PCT No.: PCT/US2019/065159
§ 371 (c)(1),
(2) Date: May 28, 2021

(87) PCT Pub. No.: WO2020/123345
PCT Pub. Date: Jun. 18, 2020

(65) Prior Publication Data
US 2022/0106502 A1   Apr. 7, 2022

Related U.S. Application Data (60) Provisional application No. 62/777,280, filed on Dec. 10, 2018.

(51) Int. Cl.
C09D 7/20 (2018.01)
C08J 3/09 (2006.01)
C09D 127/06 (2006.01)
C09D 127/24 (2006.01)
C09J 127/06 (2006.01)
C09J 127/24 (2006.01)
C08J 5/12 (2006.01)

(52) U.S. Cl.
CPC ............ C09J 127/24 (2013.01); C08J 3/096 (2013.01); C09D 7/20 (2018.01); C09D 127/06 (2013.01); C09D 127/24 (2013.01); C09J 127/06 (2013.01); C08J 5/125 (2013.01); C08J 2327/06 (2013.01)

(58) Field of Classification Search
CPC ...... C09D 127/06; C09J 127/06; C08F 14/06; C08J 3/09; C08J 3/095; C08J 3/096; C08J 5/125
See application file for complete search history.

(56) References Cited

U.S. PATENT DOCUMENTS

| 4,687,798 | A | | 8/1987 | King | |
|---|---|---|---|---|---|
| 4,873,326 | A | * | 10/1989 | Jakob | C07D 223/10 540/538 |
| 5,252,634 | A | * | 10/1993 | Patel | C08J 3/091 524/113 |
| 5,470,894 | A | * | 11/1995 | Patel | C08J 3/095 524/113 |
| 5,817,708 | A | | 10/1998 | Congelio et al. | |
| 8,481,215 | B2 | | 7/2013 | Lee et al. | |
| 2012/0201987 | A1 | | 8/2012 | Kaytan | |
| 2021/0024683 | A1 | | 1/2021 | Asirvatham et al. | |

FOREIGN PATENT DOCUMENTS

| CN | 86102197 A | 10/1986 |
|---|---|---|
| CN | 102160228 A | 8/2011 |
| CN | 105820670 A | 8/2016 |
| CS | 242532 B1 * | 5/1986 |
| JP | 2013-507485 A | 3/2013 |
| JP | 2021-519365 A | 8/2021 |
| WO | 2005/092953 A1 | 10/2005 |
| WO | 2016/158774 A1 | 10/2016 |
| WO | 2017/017473 A1 | 2/2017 |
| WO | 2019/190997 A1 | 10/2019 |

OTHER PUBLICATIONS

Machine Translation of CS242532 B1. May 15, 1986. (Year: 1986).*
Machine Translation of WO2005092953A1. Oct. 6, 2005. (Year: 2005).*
Adelman et al. Effects of Solvent Structure in Polyvinyl Chloride-Solvent Systems. J. Poly. Sci. 1958, 31, 77-94. (Year: 1958).*
International Search Report and Written Opinion received for PCT Patent Application No. PCT/US2019/065159, mailed on Feb. 12, 2020, 8 pages.

* cited by examiner

*Primary Examiner* — Stephen E Rieth
(74) *Attorney, Agent, or Firm* — Faegre Drinker Biddle & Reath LLP (57) ABSTRACT

The present disclosure provides a PVC or CPVC solvent cement and a composition for forming a PVC or CPVC coating on an object. The solvent cement and the coating composition each include one or more caprolactam-derived solvents and a polymer selected from the group of polyvinyl chloride and chlorinated polyvinyl chloride. The one or more caprolactam-derived solvents include a linear alkyl group of 1, 2 or 4 unsubstituted carbons or an alkoxymethyl group of 2 or 3 unsubstituted carbons bonded to a nitrogen heteroatom.

9 Claims, 6 Drawing Sheets

COMPOSITIONS INCLUDING PVC OR CPVC

CROSS-REFERENCE TO RELATED APPLICATIONS

This application is a U.S. 371 National Stage patent application of International Patent Application No. PCT/US2019/065159 entitled COMPOSITIONS INCLUDING PVC OR CPVC, filed Dec. 9, 2019, which claims the benefit under Title 35, U.S.C. § 119 (e) of U.S. Provisional Application Ser. No. 62/777,280 entitled COMPOSITIONS INCLUDING PVC OR CPVC, filed on Dec. 10, 2018, the entire disclosures of which are expressly incorporated by reference herein.

FIELD

The present disclosure relates to compositions including polyvinyl chloride (PVC) or chlorinated polyvinyl chloride (CPVC) in an organic solvent. In particular, the disclosure relates to compositions including solvent cement compositions and coating compositions including PVC or CPVC including a low VOC solvent.

BACKGROUND

Organic solvent-based compositions including PVC (polyvinyl chloride) or CPVC (chlorinated polyvinyl chloride) and one or more organic solvents have been used for many years for joining objects made from PVC or CPVC, or for coating objects with PVC or CPVC. When used as a solvent cement to join PVC or CPVC objects, the PVC or CPVC resin is dissolved in the composition to help to control the evaporation rate of the one or more solvents, provide the solvent cement with a suitable viscosity, and/or provide material to infill gaps between the surfaces being joined. In use, the one or more organic solvents diffuse into the PVC or CPVC surfaces of the objects to be joined, allowing increased freedom of movement of the PVC or CPVC polymer chains, softening and partially dissolving the PVC or CPVC at the surfaces. As the surfaces to be joined are brought together under pressure, the softened plastic flows, diffusing and intermingling polymer chains from each object to create strong cohesive forces between the surfaces. As the one or more solvents evaporate, the molecular entanglement is effectively frozen in place, forming a bond nearly as strong as the PVC or CPVC of the original objects.

When used as a coating material to coat an object with a layer of PVC or CPVC, some of the PVC or CPVC resin is dissolved and some is suspended in the composition. As the one or more organic solvents dissipate, the resin forms a coating of PVC or CPVC on the object.

The organic solvents typically used in such PVC or CPVC compositions include primarily tetrahydrofuran (THF) in combination with one or more ketones, such as acetone, methyl ethyl ketone (MEK), methyl propyl ketone (MPK), or cyclohexanone. THF is a volatile organic compound (VOC).

VOCs are organic compounds that once released into the atmosphere, participate in atmospheric photochemical reactions with oxides of nitrogen in the presence of sunlight to form ozone. Breathing ozone can trigger a variety of health problems, particularly for people who have lung diseases such as asthma. Governments regulate VOCs to limit the production of ground level ozone. In some jurisdictions, some VOCs are exempt from government regulation because they have been determined to have negligible photochemical reactivity. Acetone, for example, is an exempt VOC.

THF is not an exempt VOC. THF is a highly volatile VOC, with a low boiling point of 66° C. at standard temperature and pressure. There is a need for PVC/CPVC cements and coatings with less volatile VOCs to reduce the environmental impact of PVC/CPVC cements and coatings.

SUMMARY

The present disclosure provides a PVC or CPVC solvent cement and a composition for forming a PVC or CPVC coating on an object. The solvent cement and the coating composition each include a caprolactam-derived solvent and a polymer selected from the group of polyvinyl chloride and chlorinated polyvinyl chloride. The caprolactam-derived solvent is according to the general formula:

in which R is a linear alkyl group of 1, 2 or 4 unsubstituted carbons or an alkoxymethyl group of 2 or 3 unsubstituted carbons.

In one form thereof, the present disclosure provides a solvent cement including one or more caprolactam-derived solvents and a polymer. The one or more caprolactam-derived solvent is according to the general formula:

in which R is a linear alkyl group of 1, 2 or 4 unsubstituted carbons or an alkoxymethyl group of 2 or 3 unsubstituted carbons. The polymer is selected from the group of polyvinyl chloride and chlorinated polyvinyl chloride. The polymer in solution with the one or more caprolactam-derived solvent.

The polymer may consist of polyvinyl chloride. The polymer may consist of chlorinated polyvinyl chloride. The polymer may be 1 wt. % to 30 wt. % of the solvent cement.

The one or more caprolactam-derived solvents may include at least one selected from the group of N-methylcaprolactam, N-ethylcaprolactam, N-butylcaprolactam, N-(methoxymethyl)caprolactam and N-(ethoxymethyl) caprolactam. The one or more caprolactam-derived solvent may consist of N-ethylcaprolactam. A concentration of the caprolactam-derived solvent may be 5 wt. %-99 wt. % of the solvent cement.

The solvent cement may further include one or more co-solvents. The co-solvent may include a ketone having from 3 to 6 carbons. The ketone may include at least one selected from the group of acetone, methyl ethyl ketone, methyl propyl ketone, and cyclohexanone. The co-solvent may be a polar, aprotic solvent. A concentration of the caprolactam-derived solvent may be 5 wt. % to 94 wt. % of the solvent cement and a concentration of the co-solvent may be 5 wt. % to 85 wt. %. of the solvent cement. The one or more caprolactam derived solvents may consist of N-ethylcaprolactam and the one or more co-solvents may consist of acetone, methyl ethyl ketone and cyclohexanone.

In another form thereof, the present disclosure provides a method of producing a solvent cement. The method includes providing a polymer selected from the group consisting of polyvinyl chloride and chlorinated polyvinyl chloride; providing one or more caprolactam-derived solvents according to the general formula:

wherein R is a linear alkyl group of 1, 2 or 4 unsubstituted carbons or an alkoxymethyl group of 2 or 3 unsubstituted carbons; and mixing the polymer and the one or more caprolactam-derived solvents until the polymer is in solution with the one or more caprolactam-derived solvents to produce the solvent cement.

The method may further include mixing one or more co-solvents along with the polymer and the one or more caprolactam-derived solvents, wherein the one or more co-solvents include a ketone having from 3 to 6 carbons. The ketone may include at least one selected from the group of acetone, methyl ethyl ketone, methyl propyl ketone and cyclohexanone. The one or more caprolactam-derived solvents may consist of N-ethylcaprolactam and the one or more co-solvents consist of acetone, methyl ethyl ketone and cyclohexanone.

In another form thereof, the present disclosure provides a composition for forming a polymer coating on an object, the composition including a polymer and a caprolactam-derived solvent. The polymer is selected from the group of polyvinyl chloride and chlorinated polyvinyl chloride. The caprolactam-derived solvent is according to the general formula:

in which R is a linear alkyl group of 1, 2 or 4 unsubstituted carbons or an alkoxymethyl group of 2 or 3 unsubstituted carbons. A portion of the polymer is suspended in the caprolactam-derived solvent.

The polymer may consist of polyvinyl chloride. The polymer may consist of chlorinated polyvinyl chloride. The polymer may be 25 wt. % to 45 wt. % of the composition.

The caprolactam-derived solvent may include at least one selected from the group of N-methylcaprolactam, N-ethylcaprolactam, and N-butylcaprolactam. A concentration of the caprolactam-derived solvent may be 55 wt. %-75 wt. % of the composition.

The composition may further include one or more co-solvents. The co-solvent may include a ketone having from 3 to 6 carbons. The ketone may include at least one selected from the group of acetone, methyl ethyl ketone, methyl propyl ketone, and cyclohexanone. The co-solvent may be a polar, aprotic solvent. A concentration of the caprolactam-derived solvent may be 20 wt. % to 65 wt. % of the composition, and a concentration of the co-solvent may be 10 wt. % to 55 wt. %. of the composition.

The above mentioned and other features of the invention, and the manner of attaining them, will become more apparent and the invention itself will be better understood by reference to the following description.

The above mentioned and other features of the invention, and the manner of attaining them, will become more apparent and the invention itself will be better understood by reference to the following description of embodiments of the invention taken in conjunction with the accompanying drawings.

DETAILED DESCRIPTION

The present disclosure provides for PVC or CPVC solvent cements and for compositions for forming a polymer coating of PVC or CPVC in which caprolactam-derived solvents replace at least some of the more volatile organic compounds, such as at least some of the THF, for example. With boiling points significantly higher than THF, the caprolactam-derived solvents may have much lower volatility than THF, and some may not be classified as VOCs. Caprolactam-derived solvents have surprisingly been found to be effective in dissolving vinyl chloride polymers, such as PVC and CPVC.

The present disclosure provides for a solvent cement or for coating compositions including a polymer and a caprolactam-derived solvent. The polymer is selected from the group of PVC and CPVC. The polymer may consist of PVC. The polymer may consist of CPVC.

It has been found that PVC and CPVC solvent cements including N-methylcaprolactam, N-ethylcaprolactam, N-butylcaprolactam, N-(methoxymethyl)caprolactam and/or N-(ethoxymethyl)caprolactam in place of some or all of the THF can provide a wide range of viscosities. The lower viscosity PVC or CPVC cements may be useful in applications where greater flow into a joint, or tight space is needed. The higher viscosity PVC or CPVC cements may be useful in applications where less flow is desired while components are positioned for assembly, for example, in applications where the joint has a vertical orientation. In addition, because N-methylcaprolactam, N-ethylcaprolactam, N-butylcaprolactam, N-(methoxymethyl)caprolactam and N-(ethoxymethyl)caprolactam have higher boiling points than THF, it is expected that they would contribute less to the problems associated with VOCs. For example, PVC or CPVC cements including N-ethylcaprolactam may have significantly VOC because N-ethylcaprolactam is a VOC excluded solvent in the United States of America.

It has also been found that the PVC and CPVC solvent cements including N-methylcaprolactam, N-ethylcaprolactam, N-butylcaprolactam, N-(methoxymethyl)caprolactam and/or N-(ethoxymethyl)caprolactam in place of some or all of the THF build up bond strength more slowly. This may be advantageous in situations where it is desirable to have additional time to assemble the components to be bonded, and to adjust the relative positions of the components after the application of the PVC or CPVC solvent cement, such as when bonding together larger components with larger bond areas.

The caprolactam-derived solvents may be according to the general formula:

Formula I in which R is a linear, alkyl group of 1, 2 or 4 unsubstituted carbons or an alkoxymethyl group of 2 or 3 unsubstituted carbons. As shown in formula I, the linear, alkyl group of 1, 2 or 4 unsubstituted carbons or an alkoxymethyl group of 2 or 3 unsubstituted carbons is bonded to a nitrogen heteroatom. For example, if R is a methyl group (—$CH_3$) then the caprolactam-derived solvent is N-methylcaprolactam according to Formula II:

Formula II

If R is an ethyl group (—$CH_2CH_3$), then the caprolactam-derived solvent is N-ethylcaprolactam according to Formula III:

Formula III

If R is a butyl group (—$CH_2CH_2CH_2CH_3$), then the caprolactam-derived solvent is N-butylcaprolactam according to Formula IV:

Formula IV

If R is a methoxymethyl group (—$CH_2OCH_3$), then the caprolactam-derived solvent is N-(methoxymethyl)caprolactam according to Formula V:

Formula V

If R is an ethoxymethyl group (—$CH_2OCH_2CH_3$), then the caprolactam-derived solvent is N-(ethoxymethyl)caprolactam according to Formula VI:

Formula VI

The caprolactam-derived solvent may include N-ethylcaprolactam, N-butylcaprolactam, N-(m ethoxymethyl)caprolactam, N-(ethoxymethyl)caprolactam, or any combinations thereof. The caprolactam-derived solvent may consist of any one of the foregoing caprolactam-derived solvents.

The caprolactam-derived solvent may include any two of the caprolactam-derived solvents. For example, the caprolactam-derived solvent may include N-methylcaprolactam and N-ethylcaprolactam. Alternatively, the caprolactam-derived solvent may include N-methylcaprolactam and N-butylcaprolactam. Alternatively, the caprolactam-derived solvent may include N-ethylcaprolactam and N-butylcaprolactam. The caprolactam-derived solvent may consist of N-methylcaprolactam and N-ethylcaprolactam. The caprolactam-derived solvent may consist of N-methylcaprolactam and N-butylcaprolactam. The caprolactam-derived solvent may consist of N-ethylcaprolactam and N-butylcaprolactam.

In solvent cements in which the caprolactam-derived solvent includes any two of the caprolactam-derived solvents, each of the caprolactam-derived solvents may be as little as 2 weight percent (wt. %), 3 wt. %, 4 wt. %, 5 wt. %, 6 wt. %, 8 wt. %, 10 wt. %, 15 wt. %, 20 wt. %, 25 wt. %, 30 wt. %, 33 wt. %, 35 wt. %, 40 wt. %, 45 wt. %, or 49 wt. %, or as great as 51 wt. %, 55 wt. %, 60 wt. %, 65 wt. %, 67 wt. %, 70 wt. %, 75 wt. %, 80 wt. %, 85 wt. %, 90 wt. %, 92 wt. %, 93 wt. %, 94 wt. %, 95 wt. %, 96 wt. %, or 97 wt. % of the total weight of the solvent cement, or may be within any range defined between any two of the foregoing values, such as, 2 wt. % to 97 wt. %, 3 wt. % to 96 wt. %, 5 wt. % to 95 wt. %, 6 wt. % to 94 wt. %, 8 wt. % to 92 wt. %, 10 wt. % to 90 wt. %, 15 wt. % to 85 wt. %, 20 wt. % to 80 wt. %, 25 wt. % to 75 wt. %, 30 wt. % to 70 wt. %, 33 wt. % to 67 wt. %, 35 wt. % to 65 wt. %, 40 wt. % to 60, 45 wt. % to 55 wt. %, wt. %, or 49 wt. % to 51 wt. %, for example.

The solvent cements or coating compositions may include three of the caprolactam-derived solvents. In solvent cements or coating compositions, the caprolactam-derived solvents may include N-methylcaprolactam, N-ethylcaprolactam, and N-butylcaprolactam. In solvent cements or coating compositions, the caprolactam-derived solvents may consist of N-methylcaprolactam, N-ethylcaprolactam, and N-butylcaprolactam.

In solvent cements or coating compositions in which the caprolactam-derived solvent includes three of the caprolactam-derived solvents, each of the caprolactam-derived solvents can be as little as 2 wt. %, 3 wt. %, 4 wt. %, 5 wt. %, 6 wt. %, 8 wt. %, 10 wt. %, 15 wt. %, 20 wt. %, 25 wt. %, 30 wt. %, 33 wt. %, 35 wt. %, 40 wt. %, 45 wt. %, or 49 wt. %, or as great as 50 wt. %, 55 wt. %, 60 wt. %, 65 wt. %, 67 wt. %, 70 wt. %, 75 wt. %, 80 wt. %, 84 wt. %, 88 wt. %, 90 wt. %, 93 wt. % or 95 wt. % of the total weight of the solvent cement, or be within any range defined between any two of the foregoing values, such as 2 wt. % to 95 wt. %, 3 wt. % to 93 wt. %, 5 wt. % to 90 wt. %, 6 wt. % to 88 wt. %, 8 wt. % to 84 wt. %, 10 wt. % to 80 wt. %, 15 wt. % to 70 wt. %, 20 wt. % to 60 wt. %, or 25 wt. % to 50 wt. %, for example.

The solvent cement or coating composition may further include one or more co-solvents. The co-solvent may be a polar, aprotic solvent. The co-solvent may include a ketone having from 3 to 6 carbons. The co-solvent may consist of a ketone having from 3 to 6 carbons. The ketone may include acetone, methyl ethyl ketone, methyl propyl ketone, cyclohexanone, or any combination thereof. The ketone may consist of acetone, methyl ethyl ketone, methyl propyl ketone, cyclohexanone, or any combination thereof. The ketone may consist of acetone, methyl ethyl ketone and cyclohexanone.

The polymer in the solvent cements according to this disclosure are in solution with, or dissolved in, the caprolactam-derived solvents. The polymer may be as little as 1 wt. %, 2 wt. %, 4 wt. %, 6 wt. %, 8 wt. %, 10 wt. %, or 12 wt. %, or as much as 14 wt. %, 15 wt. %, 16 wt. %, 18 wt. %, 20 wt. %, 22 wt. %, 26 wt. %, or 30 wt. % of the total weight of the solvent cement, or be within any range defined between any two of the foregoing values, such as 1 wt. % to 30 wt. %, 2 wt. % to 26 wt. %, 4 wt. % to 22 wt. %, 6 wt. % to 20 wt. %, 8 wt. % to 18 wt. %, 10 wt. % to 15 wt. %, or 12 wt. % to 14 wt. %, for example.

For the solvent cements according to this disclosure, the caprolactam-derived solvent may be as little as 70 wt. %, 74 wt. %, 78 wt. %, 80 wt. %, 82 wt. %, 84 wt. %, or 86 wt. %, or as much as 88 wt. %, 90 wt. %, 92 wt. %, 94 wt. %, 96 wt. %, 98 wt. %, or 99 wt. % of the total weight of the solvent cement, or be within any range defined between any two of the foregoing values, such as 70 wt. % to 99 wt. %, 74 wt. % to 98 wt. %, 78 wt. % to 96 wt. %, 80 wt. % to 94 wt. %, 82 wt. % to 92 wt. %, 84 wt. % to 90 wt. %, or 86 wt. % to 88 wt. %, for example.

For the solvent cements according to this disclosure that further include one or more co-solvents, the caprolactam-derived solvent may be as little as 5 wt. %, 8 wt. %, 10 wt. %, 15 wt. %, 20 wt. %, 25 wt. %, 35 wt. %, 40 wt. %, 45 wt. %, or 50 wt. %, or as much as 55 wt. %, 60 wt. %, or 65 wt. %, 70 wt. %, 75 wt. %, 80 wt. %, 84 wt. %, 88 wt. %, 91 wt. %, or 94 wt. % of the total weight of the solvent cement, or be within any range defined between any two of the foregoing values, such as 5 wt. % to 94 wt. %, 8 wt. % to 91 wt. %, 15 wt. % to 88 wt. %, 20 wt. % to 70 wt. %, 5 wt. % to 15 wt. %, 10 wt. % to 20 wt. %, 10 wt. % to 15 wt. %, 35 wt. % to 94 wt. %, 40 wt. % to 91 wt. %, 45 wt. % to 88 wt. %, 50 wt. % to 84 wt. %, 55 wt. % to 80 wt. %, 60 wt. % to 45 wt. %, or 65 wt. % to 70 wt. %, for example.

For the solvent cements according to this disclosure that further include one or more co-solvents, the co-solvent may be as little as 5 wt. %, 6 wt. %, 8 wt. %, 10 wt. %, 12 wt. %, 14 wt. %, or 16 wt. %, 18 wt. %, 20 wt. %, 23 wt. %, 26 wt. %, 29 wt. %, or as much as 32 wt. %, 35 wt. %, 40 wt. %, 45 wt. %, 50 wt. %, 55 wt. %, 60 wt. %, 65 wt. % 70 wt. %, 75 wt. %, 80 wt. % or 85 wt. % of the total weight of the solvent cement, or be within any range defined between any two of the foregoing values, such as 5 wt. % to 85 wt. %, 6 wt. % to 80 wt. %, 8 wt. % to 75 wt. %, 10 wt. % to 70 wt. %, 12 wt. % to 65 wt. %, 14 wt. % to 60 wt. %, 5 wt. % to 35 wt. %, 6 wt. % to 32 wt. %, 8 wt. % to 29 wt. %, 10 wt. % to 26 wt. %, 12 wt. % to 23 wt. %, 14 wt. % to 20 wt. %, 16 wt. % to 18 wt. %, 50 wt. % to 80 wt. %, 55 wt. %, to 75 wt. %, 70 wt. % to 80 wt. %, or 75 wt. % to 80 wt. %, for example.

A portion of the polymer in the coating compositions according to this disclosure may be suspended in the caprolactam-derived solvents, with the balance in solution with the caprolactam-derived solvents. The polymer may be as little as 25 wt. %, 26 wt. %, 27 wt. %, 28 wt. %, 29 wt. %, 30 wt. %, or 31 wt. %, or as much as 32 wt. %, 34 wt. %, 36 wt. %, 38 wt. %, 40 wt. %, 42 wt. %, or 45 wt. % of the total weight of the coating composition, or be within any range defined between any two of the foregoing values, such as 25 wt. % to 45 wt. %, 26 wt. % to 42 wt. %, 27 wt. % to 40 wt. %, 28 wt. % to 38 wt. %, 29 wt. % to 36 wt. %, 30 wt. % to 34 wt. %, or 31 wt. % to 32 wt. %, for example.

For the coating compositions according to this disclosure, the caprolactam-derived solvent may be as little as 55 wt. %, 56 wt. %, 57 wt. %, 58 wt. %, 59 wt. %, 60 wt. %, or 61 wt. %, or as much as 62 wt. %, 64 wt. %, 66 wt. %, 68 wt. %, 70 wt. %, 72 wt. %, or 75 wt. % of the total weight of the coating composition, or be within any range defined between any two of the foregoing values, such as 55 wt. % to 75 wt. %, 56 wt. % to 72 wt. %, 57 wt. % to 70 wt. %, 58 wt. % to 68 wt. %, 59 wt. % to 66 wt. %, 60 wt. % to 64 wt. %, or 61 wt. % to 62 wt. %, for example.

For the coating compositions according to this disclosure that further include one or more co-solvents, the caprolactam-derived solvent may be as little as 20 wt. %, 23 wt. %, 26 wt. %, 29 wt. %, 32 wt. %, 35 wt. %, or 38 wt. %, or as much as 41 wt. %, 44 wt. %, 48 wt. %, 52 wt. %, 56 wt. %, 60 wt. %, or 65 wt. % of the total weight of the coating composition, or be within any range defined between any two of the foregoing values, such as 20 wt. % to 65 wt. %, 23 wt. % to 60 wt. %, 26 wt. % to 56 wt. %, 29 wt. % to 52 wt. %, 32 wt. % to 48 wt. %, 35 wt. % to 44 wt. %, or 38 wt. % to 41 wt. %, for example.

For the coating compositions according to this disclosure that further include one or more co-solvents, the co-solvent may be as little as 10 wt. %, 13 wt. %, 16 wt. %, 19 wt. %, 22 wt. %, 25 wt. %, or 28 wt. %, or as much as 31 wt. %, 34 wt. %, 38 wt. %, 42 wt. %, 46 wt. %, 50 wt. %, or 55 wt. % of the total weight of the coating composition, or be within any range defined between any two of the foregoing values, such as 10 wt. % to 55 wt. %, 13 wt. % to 50 wt. %, 16 wt. % to 46 wt. %, 19 wt. % to 42 wt. %, 22 wt. % to 38 wt. %, 25 wt. % to 34 wt. %, or 28 wt. % to 31 wt. %, for example.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

While this invention has been described as relative to exemplary designs, the present invention may be further modified within the spirit and scope of this disclosure. Further, this application is intended to cover such departures from the present disclosure as come within known or customary practice in the art to which this invention pertains.

EXAMPLES

Example 1—Comparative Viscosity of Polyvinyl Chloride Solvent Cements Including Co-Solvents In this Example, the comparative viscosity of PVC solvent cements produced with various solvents and co-solvents, is demonstrated. Five PVC solvent solutions were prepared by adding 1 g of PVC resin to a solvent mixture including co-solvents in the amounts of 1.5 g of cyclohexanone, 1.5 g of acetone, and 1.8 g of methyl ethyl ketone, and 4.2 g of one of five solvents to be compared: tetrahydrofuran (THF), N-methyl pyrrolidone (NMP), N-methylcaprolactam (A6-2), N-ethylcaprolactam (A6-3), and N-butylcaprolactam (A6-5). The PVC resin was RMA 57 from Ronald Mark Associates, Inc., Hillside, N.J. The PVC resin was a free-flowing powder with an inherent viscosity of 0.67 (per ASTM D1243-79).

Each of the five PVC/solvent mixtures was mixed on a tube roller until all the PVC resin appeared to be dissolved, producing five PVC solutions, each with 10.0 wt. % PVC. The viscosity of each of the 10.0 wt. % PVC solutions was measured using a Brookfield Viscometer DV-11+ at approximately 25° C. using a small sample adapter and a spindle 18.

After measuring the viscosity of each of the 10.0 wt. % PVC solutions, additional PVC resin was added to each and mixed on a tube roller until all the additional PVC resin appeared to dissolve, to produce five PVC solutions, each with 12.0 wt. % PVC. The viscosity of each of the 12.0 wt. % PVC solutions was measured as with the 10.0 wt. % PVC solutions. The process of adding PVC resin to the five PVC solutions, mixing, and measuring the viscosity was repeated to obtain viscosity measurements for PVC solutions having 13.0 wt. %, 14.0 wt. %, and 15.0 wt. % PVC. However, the 15.0 wt. % PVC solutions including A6-3 or A6-5 were not made because the expected viscosity based on the viscosities of the lower PVC concentrations would have been too high to be useful.

Figure 1:
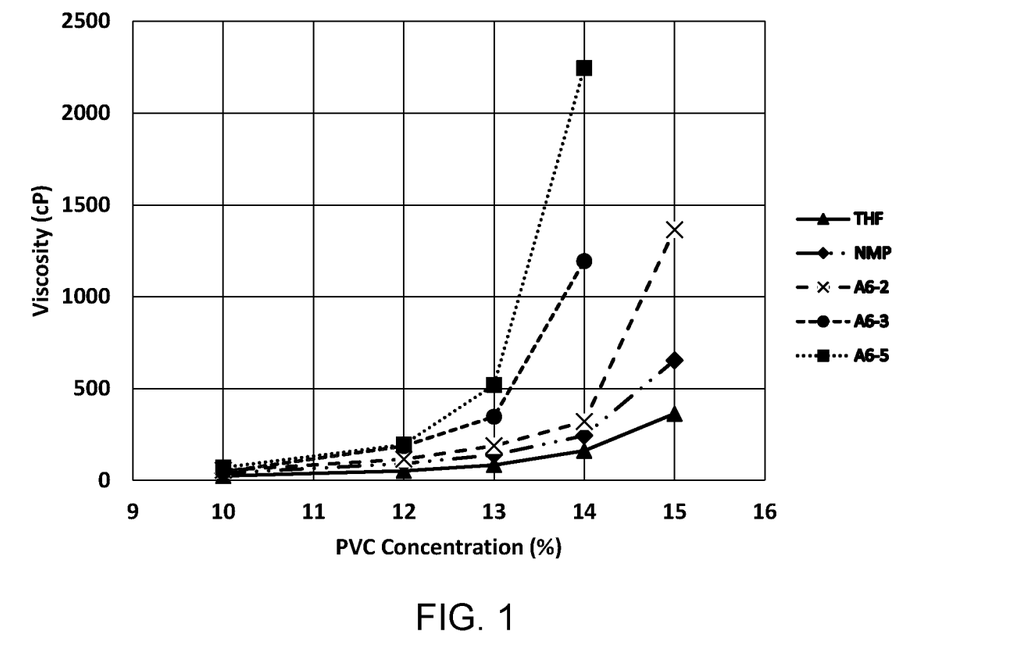
FIG. 1 is graph of viscosity as a function of PVC concentration for polyvinyl chloride solvent cements including co-solvents, according to this disclosure.

The results are shown in FIG. 1 for each of the five solvents. As shown in FIG. 1, the PVC solutions including A6-2, A6-3, and A6-5 can provide a wide range of viscosities. The lower viscosity PVC solutions may be useful as a PVC solvent cement in applications where greater flow into a joint, or tight space is needed. The higher viscosity PVC solutions may be useful as a PVC solvent in applications where less flow is desired while components are positioned for assembly, for example, in application where the joint has a vertical orientation. In addition, because A6-2, A6-3, and A6-5 have higher boiling points than either THF or NMP, it is expected that they would contribute less to the problems associated with VOCs.

Example 2—Comparative Viscosity of Polyvinyl Chloride Solvent Cements Without Co-Solvents In this Example, the comparative viscosity of PVC solvent cements produced with various solvents, is demonstrated. Five PVC solvent solutions were prepared by adding 0.5 g of PVC resin to 9.5 g of one of five solvents to be compared: tetrahydrofuran (THF), N-methyl pyrrolidone (NMP), N-methylcaprolactam (A6-2), N-ethylcaprolactam (A6-3), and N-butylcaprolactam (A6-5). The PVC resin was RMA 57 from Ronald Mark Associates, Inc., Hillside, N.J. The PVC resin was a free-flowing powder with an inherent viscosity of 0.67 (per ASTM D1243-79).

Each of the five PVC/solvent mixtures was mixed on a tube roller until all the PVC resin appeared to be dissolved, producing five PVC solutions, each with 5.0 wt. % PVC. The viscosity of each of the 5.0 wt. % PVC solutions was measured using a Brookfield Viscometer DV-11+ at approximately 25° C. using a small sample adapter and a spindle 18.

After measuring the viscosity of each of the 5.0 wt. % PVC solutions, additional PVC resin was added to each and mixed on a tube roller until all the additional PVC resin appeared to dissolve, to produce five PVC solutions, each with 10.0 wt. % PVC. The viscosity of each of the 12.0 wt. % PVC solutions was measured as with the 5.0 wt. % PVC solutions. The process of adding PVC resin to the five PVC solutions, mixing, and measuring the viscosity was repeated three more times to obtain viscosity measurements for PVC solutions having 12.0 wt. %, 13.0 wt. %, and 14.0 wt. % PVC. However, the 14.0 wt. % PVC solutions including A6-2, A6-3 or A6-5, and the 12.0 wt. % PVC solution including the A6-5 were not made because the expected viscosity based on the viscosities of the lower PVC concentrations would have been too high to be useful.

Figure 2:
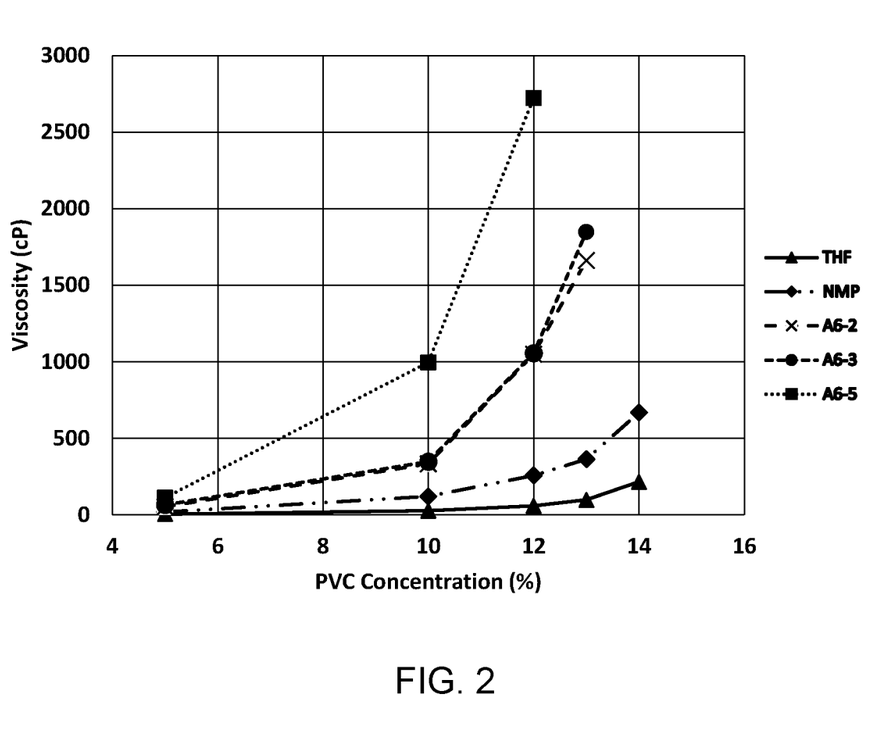
FIG. 2 is graph of viscosity as a function of PVC concentration for polyvinyl chloride solvent cements without co-solvents, according to this disclosure.

The results are shown in FIG. 2 for each of the five solvents. As shown in FIG. 2, the PVC solutions including A6-2, A6-3, and A6-5 can provide a wide range of viscosities. As with the solutions in Example 1, the lower viscosity PVC solutions may be useful as a PVC solvent cement in applications where greater flow into a joint, or tight space is needed. The higher viscosity PVC solutions may be useful as a PVC solvent in applications where less flow is desired while components are positioned for assembly, for example, in application where the joint has a vertical orientation. In addition, because A6-2, A6-3, and A6-5 have higher boiling points than either THF or NMP, it is expected that they would contribute less to the problems associated with VOCs.

Example 3—Comparative Lap Shear Strength of Polyvinyl Chloride Solvent Cements Including Co-Solvents In this Example, the comparative lap shear strength of PVC solvent cements produced with various solvents and co-solvents, is demonstrated. Five PVC solvent solutions were prepared by adding 1.2 g of PVC resin to a solvent mixture including co-solvents in the amounts of 1.5 g of cyclohexanone, 1.5 g of acetone, and 1.8 g of methyl ethyl ketone, and 4.0 g of one of five solvents to be compared: tetrahydrofuran (THF), N-methyl pyrrolidone (NMP), N-methylcaprolactam (A6-2), N-ethylcaprolactam (A6-3), and N-butylcaprolactam (A6-5). The PVC resin was RMA 57 from Ronald Mark Associates, Inc., Hillside, N.J. The PVC resin was a free-flowing powder with an inherent viscosity of 0.67 (per ASTM D1243-79). Each of the five PVC/solvent mixtures was mixed on a tube roller until all the PVC resin appeared to be dissolved, producing five PVC solutions, each with 12.0 wt. % PVC. The viscosity of each of the PVC solutions was measured using a Brookfield Viscometer DV-11+ at approximately 25° C. using a small sample adapter and a spindle 18. The results are shown in Table 1 below:

TABLE 1

| Solvent | Viscosity (cP) |
| --- | --- |
| THF | 47.7 |
| NMP | 78.4 |
| A6-2 | 97.8 |
| A6-3 | 109.8 |
| A6-5 | 268.1 |

ASTM D2564 was followed for preparing lap shear test samples, except that the PVC sheets were thinner to accommodate the available fixturing for the Instron® Universal Testing System used to measure the lap shear strength per ASTM D3163-01. Each of the lap shear test samples was prepared from sheets of gray PVC $\frac{1}{16}$ of an inch in thickness cut into 1-inch by 3-inch pieces. One of the PVC solvent cements was applied to a 1-inch by 1-inch surface to bond together two of the PVC sheets. The bonded PVC sheets were pressed together lightly by hand, and then pressed together with a 2-kg load for 3 minutes. This was repeated multiple times for each PVC solution to produce multiple test samples for each of the five PVC solutions.

Lap shear strength was measured on some of the test samples from each of the PVC solutions 2 hours after bonding, and on others of the test samples from each of the PVC solutions 16 hours after bonding. For each combination of PVC solvent and time after bonding, from 4 to 10 samples were measured. The samples were measured on the Instron® Universal Testing System at a test speed of 0.1 inch/min., a 5 kN load cell, and a gauge length of 2 inches. The results are shown in Table 2 below:

TABLE 2

| Solvent | Lap Shear 2 hr. (psi) | Lap Shear 16 hr. (psi) |
| --- | --- | --- |
| THF | 196.4 ± 34.9 | 264.6 ± 55.5 |
| NMP | 196.7 ± 38.7 | 253.9 ± 61.4 |
| A6-2 | 158.6 ± 22.7 | 180.0 ± 68.2 |
| A6-3 | 123.2 ± 31.8 | 189.7 ± 20.9 |
| A6-5 | 95.1 ± 42.0 | 140.6 ± 46.8 |

As shown in Table 2, the PVC solvent cements including A6-2, A6-3, or A6-5 built up bond strength more slowly. This may be advantageous in situations where it may be desirable to have additional time to assemble the components to be bonded, and to adjust the relative positions of the components after the application of the PVC solvent cement, such as when bonding together larger components with larger bond areas.

Example 4—Comparative Lap Shear Strength of Chlorinated Polyvinyl Chloride Solvent Cements Including Co-Solvents In this Example, the comparative lap shear strength of CPVC solvent cements produced with various solvents and co-solvents, is demonstrated. Five CPVC solvent solutions were prepared by adding 1.4 g of CPVC resin to a solvent mixture including co-solvents in the amounts of 1.5 g of cyclohexanone, 1.5 g of acetone, and 1.8 g of methyl ethyl ketone, and 4.0 g of one of five solvents to be compared: tetrahydrofuran (THF), N-methyl pyrrolidone (NMP), N-methylcaprolactam (A6-2), N-ethylcaprolactam (A6-3), and N-butylcaprolactam (A6-5). The CPVC resin was J-700 from VIA-OLE Chemical Co. Ltd. The CPVC resin was a white powder with 67.3% chlorine content. Each of the five CPVC/solvent mixtures was mixed on a tube roller until all the CPVC resin appeared to be dissolved, producing five CPVC solutions, each with 14.0 wt. % CPVC. The viscosity of each of the CPVC solutions was measured using a Brookfield Viscometer DV-11+ at approximately 25° C. using a small sample adapter and a spindle 18. The results are shown in Table 3 below:

TABLE 3

| Solvent | Viscosity (cP) |
| --- | --- |
| THF | 192.3 |
| NMP | 344.9 |
| A6-2 | 470.9 |
| A6-3 | 505.4 |
| A6-5 | 586.7 |

Lap shear test samples were prepared as described above for Example 3. to produce multiple test samples for each of the five CPVC solutions. Lap shear strength was measured on some of the test samples from each of the CPVC solutions 2 hours after bonding, and on others of the test samples from each of the CPVC solutions 19 hours after bonding. For each combination of CPVC solvent and time after bonding, from 3 to 5 samples were measured. The samples were measured on the Instron® Universal Testing System as described above in Example 3. The results are shown in Table 4 below:

TABLE 4

| Solvent | Lap Shear 2 hr. (psi) | Lap Shear 19 hr. (psi) |
| --- | --- | --- |
| THF | 170.9 ± 21.2 | 268.4 ± 80.4 |
| NMP | 167.5 ± 12.6 | 225.1 ± 34.9 |
| A6-2 | 90.4 ± 40.9 | 143.7 ± 90.5 |
| A6-3 | 97.8 ± 46.3 | 126.6 ± 71.2 |
| A6-5 | 84.9 ± 13.5 | 92.5 ± 52.1 |

As shown in Table 4, the CPVC solvent cements including A6-2, A6-3, or A6-5 built up bond strength more slowly. As noted above, this may be advantageous in situations where it may be desirable to have additional time to assemble the components to be bonded, and to adjust the relative positions of the components after the application of the CPVC solvent cement, such as when bonding together larger components with larger bond areas.

Example 5—Comparative Performance of Polyvinyl Chloride Solvent Cements Including Co-Solvents In this Example, the relative performance of PVC solvent cements produced with various concentrations of solvents and co-solvents, is demonstrated. In addition to the five solvents evaluated in Example 3 above, N-(methoxymethyl) caprolactam (A6-13) and N-(ethoxymethyl)caprolactam (A6-14) were also evaluated. The PVC resin was RMA 57 from Ronald Mark Associates, Inc., Hillside, NJ. The PVC resin was a free-flowing powder with an inherent viscosity of 0.67 (per ASTM D1243-79). The PVC solvent cements were prepared by adding 12.0 wt. % of PVC resin to a solvent or solvent mixture and mixed on a tube roller until all the PVC resin appeared to be dissolved, producing the sixteen PVC solvent cements shown in Table 5 below. Also included in Table 5 are two commercially available PVC solvent cements evaluated for comparison, identified as Commercial-1 and Commercial-2. Commercial-1 is Oatey® Low VOC All Purpose Solvent Cement. Commercial-2 is Carlon® Low VOC Gray PVC Solvent Cement.

The viscosity of each of the PVC solvent cements was measured using a Brookfield Viscometer DV-11+ at approximately 25° C.±0.2° C. using a small sample adapter and a spindle 18. The volatile organic content (VOC) of some of the solvent cements was determined according to Equation I:

VOC (g/L)=[100−(polymer wt. %)−(acetone wt. %)−(A6-3 wt. %)−(silica wt. %)]×(density of solution (g/mL)×10.   Equation 1

The weight percentage of acetone was excluded because it is a VOC exempt solvent. The weight percentage of A6-3 was excluded because it is a VOC excluded solvent. The weight percentages of polymer and silica (see Example 7) were excluded as non-volatile content. The viscosity and VOC results are shown in Table 5.

As shown in Table 5, all solvent cements had a reasonable viscosity. A reasonable viscosity is from about 90 cP for regular solvent cement up to about 1,600 cP for heavy bodied solvent cement. As expected, the addition of A6-3 or increasing the concentration of acetone lowers the VOC significantly.

Lap shear test samples were prepared per ASTM D2564 using the PVC solvent cements shown in Table 5, except that the PVC sheets were thinner to accommodate the available fixturing for the Instron® Universal Testing System used to measure the lap shear strength per ASTM D3163-01. Each of the lap shear test samples was prepared from sheets of white PVC ¼ of an inch in thickness cut into 1-inch by 2-inch pieces. One of the PVC solvent cements was applied to a 1-inch by 1-inch surface to bond together two of the PVC sheets. The bonded PVC sheets were pressed together lightly by hand, and then pressed together with a 2-kg load for 3 minutes. This was repeated multiple times for each PVC solvent cement to produce twenty-one test samples for each of the PVC solvent cements.

Lap shear strength was measured for seven of the test samples for each of the PVC solvent cements two hours after bonding, for seven test samples from each of the PVC solvent cements sixteen hours after bonding, and for seven test samples from each of the PVC solvent cements seventy-two hours after bonding. For each set of seven test samples measured, the highest and lowest measurements were discarded and the numerical average of the remaining five measurements reported as the lap shear strength for the corresponding PVC solvent cement. The test samples were measured on the Instron® Universal Testing System at a test speed of 0.1 inch/min., a 5 kN load cell, and a gauge length of 2 inches. The results for each PVC solvent cement are shown in Table 6 below.

TABLE 5

| Cement | Solvent | Cyclohexanone | Acetone | MEK | PVC Resin | Viscosity (cP) | VOC (g/L) |
|---|---|---|---|---|---|---|---|
| 1 | THF (40%) | 15% | 15% | 18% | 12% | 58 | 673 |
| 2 | NMP (40%) | 15% | 15% | 18% | 12% | 122 | 702 |
| 3 | Sol-2 (40%) | 15% | 15% | 18% | 12% | 127 | 698 |
| 4 | Sol-3 (40%) | 15% | 15% | 18% | 12% | 172 | 316 |
| 5 | Sol-5 (40%) | 15% | 15% | 18% | 12% | 177 | 681 |
| 6 | Sol-13 (40%) | 15% | 15% | 18% | 12% | 177 | — |
| 7 | Sol-14 (40%) | 15% | 15% | 18% | 12% | 147 | — |
| 8 | Sol-2 (10%) | 15% | 45% | 18% | 12% | 119 | — |
| 9 | Sol-2 (28%) | 15% | 45% | 0% | 12% | 298 | — |
| 10 | Sol-2 (40%) | 15% | 33% | 0% | 12% | 100 | — |
| 11 | Sol-3 (10%) | 15% | 45% | 18% | 12% | 568 | 287 |
| 12 | Sol-3 (28%) | 15% | 45% | 0% | 12% | 147 | 132 |
| 13 | Sol-3 (40%) | 15% | 33% | 0% | 12% | 119 | 141 |
| 14 | Sol-14 (44%) | 18% | 26% | 0% | 12% | 534 | — |
| 15 | Sol-2 (44%) | 18% | 26% | 0% | 12% | 118 | — |
| 16 | Sol-3 (35%) | 18% | 35% | 0% | 12% | 125 | — |
| 17 | Commercial-1 | — | — | — | — | 1614 | — |
| 18 | Commercial-2 | | | | | NA | — |

TABLE 6

| | | Lap Shear (psi) | | |
|---|---|---|---|---|
| Cement | Solvent | After 2 hours | After 16 hours | After 72 hours |
| 1 | THF (40%) | 227 ± 21 | 417 ± 70 | 894 ± 127 |
| 2 | NMP (40%) | 206 ± 42 | 411 ± 124 | 744 ± 87 |
| 3 | Sol-2 (40%) | 129 ± 31 | 339 ± 101 | 447 ± 44 |
| 4 | Sol-3 (40%) | 160 ± 10 | 319 ± 50 | 404 ± 64 |
| 5 | Sol-5 (40%) | 165 ± 24 | 335 ± 32 | 431 ± 40 |
| 6 | Sol-13 (40%) | 161 ± 17 | 312 ± 62 | 361 ± 79 |
| 7 | Sol-14 (40%) | 142 ± 24 | 269 ± 62 | 482 ± 55 |
| 8 | Sol-2 (10%) | 196 ± 60 | 300 ± 127 | 776 ± 86 |
| 9 | Sol-2 (28%) | 167 ± 17 | 332 ± 102 | 636 ± 78 |
| 10 | Sol-2 (40%) | 136 ± 34 | 345 ± 57 | 631 ± 49 |
| 11 | Sol-3 (10%) | 171 ± 33 | 472 ± 45 | 656 ± 93 |
| 12 | Sol-3 (28%) | 196 ± 34 | 261 ± 41 | 419 ± 100 |
| 13 | Sol-3 (40%) | 165 ± 34 | 260 ± 70 | 426 ± 72 |
| 14 | Sol-14 (44%) | 111 ± 33 | 325 ± 50 | 370 ± 73 |
| 15 | Sol-2 (44%) | 161 ± 52 | 336 ± 29 | 488 ± 58 |
| 16 | Sol-3 (35%) | 170 ± 31 | 372 ± 86 | 545 ± 65 |
| 17 | Commercial-1 | 256 ± 55 | 304 ± 58 | 836 ± 65 |
| 18 | Commercial-2 | 260 ± 54 | 417 ± 33 | 926 ± 86 |

Figure 3:
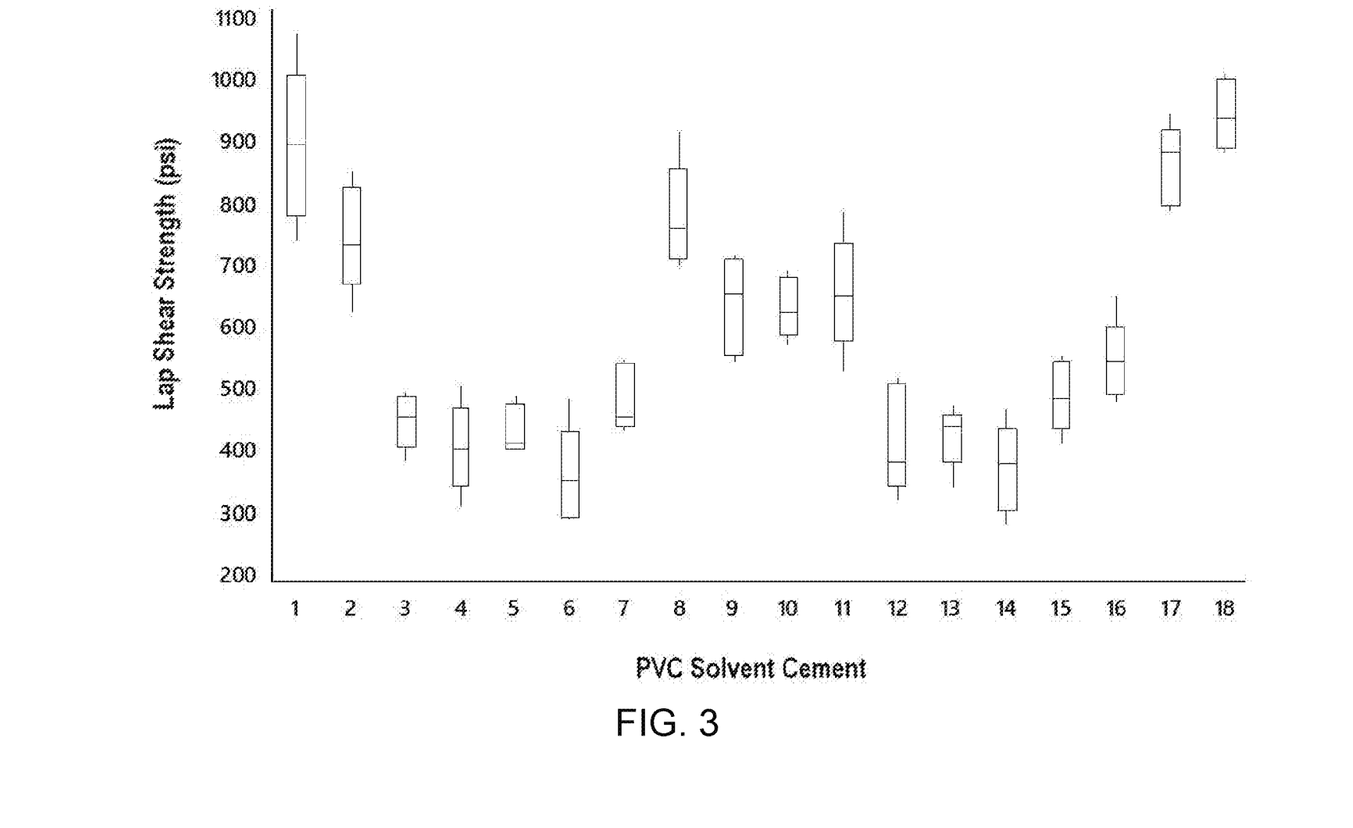
FIG. 3 is a box plot of lap shear strengths for PVC solvent cements seventy-two hours after bonding, according to this disclosure.

The lap shear strengths were comparable among all of the PVC solvent cements after two hours and after sixteen hours. However, distinct differences were observed after seventy-two hours, as shown in FIG. 3. Specifically, the lap shear strengths of test samples made from formulations of PVC solvent cements 8-11 are comparable to those made with THF, NMP and the two commercial PVC cements.

Example 6—Comparative Performance of Chlorinated Polyvinyl Chloride Solvent Cements Including Co-Solvents In this Example, the relative performance of CPVC solvent cements produced with various concentrations of solvents and co-solvents, is demonstrated. In addition to the five solvents evaluated in Example 4 above, N-(methoxymethyl)caprolactam (A6-13) and N-(ethoxymethyl)caprolactam (A6-14) were also evaluated. The CPVC resin was J-700 from VIA-OLE Chemical Co. Ltd. The CPVC resin was a white powder with 67.3% chlorine content. The CPVC solvent cements were prepared by adding 14.0 wt. % of CPVC resin to a solvent mixture and mixed on a tube roller until all the CPVC resin appeared to be dissolved, producing the seven CPVC solvent cements shown in Table 7 below.

The viscosity of each of the CPVC solvent cements was measured as described above for Example 5. The volatile organic content (VOC) was determined for each of the CPVC solvent cements as described above for Example 5. The viscosity and VOC results are shown in Table 7. As shown in Table 7, all solvent cements had a reasonable viscosity. As expected, the addition of A6-3 or increasing the concentration of acetone lowers the VOC significantly.

Lap shear test samples were prepared and tested as described above in Example 5. The results for each CPVC solvent cement are shown in Table 8 below. The Commercial-1 and Commercial-2 solvent cements are included for comparison.

TABLE 8

| | | Lap Shear (psi) | | |
|---|---|---|---|---|
| Cement | Solvent | After 2 hours | After 16 hours | After 72 hours |
| 19 | THF (38%) | 262 ± 26 | 544 ± 69 | 824 ± 85 |
| 20 | NMP (38%) | 238 ± 23 | 509 ± 45 | 771 ± 90 |
| 21 | Sol-2 (38%) | 205 ± 16 | 389 ± 60 | 548 ± 65 |
| 22 | Sol-3 (38%) | 187 ± 10 | 380 ± 54 | 540 ± 42 |
| 23 | Sol-5 (38%) | 161 ± 30 | 334 ± 44 | 525 ± 51 |
| 24 | Sol-3 (10%) | 284 ± 42 | 467 ± 101 | 988 ± 97 |
| 25 | Sol-3 (38%) | 329 ± 42 | 662 ± 96 | 908 ± 97 |
| 17 | Commercial-1 | 256 ± 55 | 304 ± 58 | 836 ± 65 |
| 18 | Commercial-2 | 260 ± 54 | 417 ± 33 | 926 ± 86 |

Figure 4:
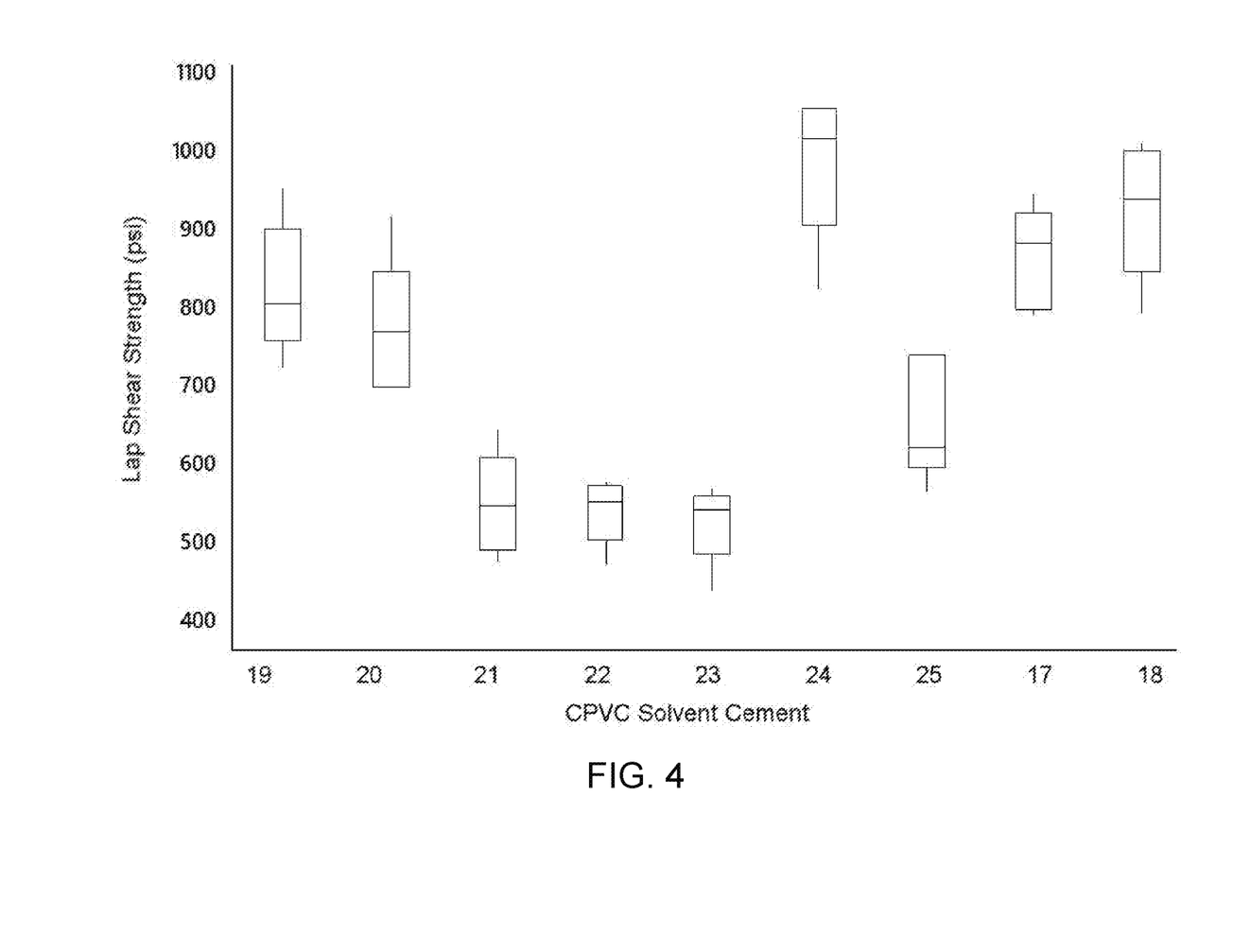
FIG. 4 is a box plot of lap shear strengths for CPVC solvent cements seventy-two hours after bonding, according to this disclosure.

As observed with the PVC solution cements of Example 5, the lap shear strengths were comparable among all of the CPVC solvent cements after two hours and after sixteen hours. However, distinct differences were observed after seventy-two hours, as shown in FIG. 4. Specifically, the lap shear strengths of test samples made from formulations of PVC solvent cements 31 and 32 are comparable to those made with THF, NMP and the two commercial PVC cements.

Example 7—Comparative Performance of Polyvinyl Chloride and Chlorinated Polyvinyl Chloride Solvent Cements Including Co-Solvents and Fumed Silica In this Example, the relative performance of PVC solvent cements and CPVC solvent cements including fumed silica produced with THF or A6-3, is demonstrated. Silica is a thixotropic agent which can be added to adjust the viscosity range of the solvent cement. The PVC solvent cements were prepared by adding 12.0 wt. % of PVC resin and 1 wt. % fumed silica to mixtures including THF or A6-3, as described above in reference to Example 5. The CPVC solvent cements were prepared by adding 14.0 wt. % of CPVC resin and 1 wt. % fumed silica to solvent mixtures including THF or A6-3, as described above in reference to Example 6. A total of four solvent cements were produced, as shown in Table 9 below.

The viscosity of each of the PVC and CPVC solvent cements was measured as described above for Example 5. The volatile organic content (VOC) was determined for each of the PVC and CPVC solvent cements as described above for Example 5. The viscosity and VOC results are shown in

TABLE 7

| Cement | Solvent | Cyclohexanone | Acetone | MEK | CPVC Resin | Viscosity (cP) | VOC (g/L) |
|---|---|---|---|---|---|---|---|
| 19 | THF (38%) | 15% | 15% | 18% | 14% | 204 | 649 |
| 20 | NMP (38%) | 15% | 15% | 18% | 14% | 290 | 681 |
| 21 | Sol-2 (38%) | 15% | 15% | 18% | 14% | 338 | 680 |
| 22 | Sol-3 (38%) | 15% | 15% | 18% | 14% | 420 | 318 |
| 23 | Sol-5 (38%) | 15% | 15% | 18% | 14% | 417 | 662 |
| 24 | Sol-3 (10%) | 15% | 43% | 18% | 14% | 1085 | 290 |
| 25 | Sol-3 (38%) | 15% | 33% | 0% | 14% | 358 | 142 |

Table 9. As shown in Table 9, all solvent cements except for the CPVC solvent cement including A6-3 had a reasonable viscosity. As expected, the use of A6-3 instead of THF or increasing the concentration of acetone lowers the VOC significantly.

TABLE 9

| Cement | Solvent | Cyclohexanone | Acetone | MEK | Resin | Viscosity (cP) | VOC (g/L) |
|---|---|---|---|---|---|---|---|
| 26 | THF (40%) | 15% | 14% | 18% | PVC 12% | 68 | 653 |
| 27 | Sol-3 (10%) | 15% | 44% | 18% | PVC 12% | 1185 | 286 |
| 28 | THF (38%) | 15% | 14% | 18% | CPVC 14% | 415 | 663 |
| 29 | Sol-3 (10%) | 15% | 42% | 18% | CPVC 14% | 4400 | 294 |

Lap shear test samples were prepared and tested as described above in Example 5. The results for each PVC and CPVC solvent cement are shown in Table 10 below.

TABLE 10

| | | Lap Shear (psi) | | |
|---|---|---|---|---|
| Cement | Solvent | After 2 hours | After 16 hours | After 72 hours |
| 26 | THF (40%) | 293 ± 49 | 606 ± 61 | 815 ± 124 |
| 27 | Sol-3 (10%) | 187 ± 29 | 484 ± 59 | 653 ± 104 |
| 28 | THF (38%) | 301 ± 62 | 663 ± 73 | 972 ± 67 |
| 29 | Sol-3 (10%) | 413 ± 70 | 694 ± 74 | 870 ± 47 |

Figure 5:
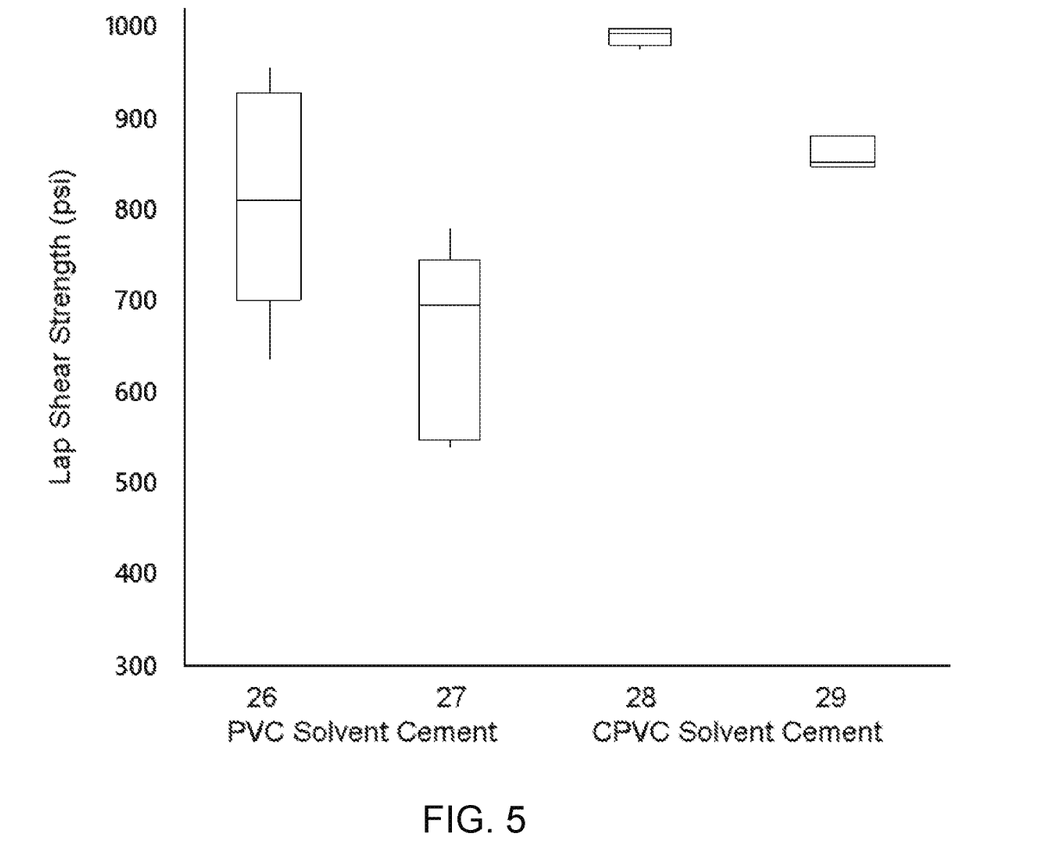
FIG. 5 is a box plot of lap shear strengths for PVC solvent cements and CPVC solvent cements including fumed silica seventy-two hours after bonding, according to this disclosure.

The lap shear strengths were comparable among all of the PVC and CPVC solvent cements after two hours and after sixteen hours. The lap shear strengths were also comparable among all of the PVC and CPVC solvent cements after seventy-two hours, as shown in FIG. 5. Without wishing to be bound by any theory, it is believed that the increase in strength of the A6-3 solvent cements with the addition of fumed silica may be due to the higher viscosity of the solvent cements, which may lower the evaporation rate of the solvent. The lower evaporation rate may allow time for an increase in the penetration of the solvent cement into the PVC sheet, resulting in a stronger bond. The stronger bond with the CPVC solvent cements compared with the PVC solvent cements may be due to the higher concentration of polymer in the CPVC solvent cements.

Example 8—Comparative Performance of Polyvinyl Chloride and Chlorinated Polyvinyl Chloride Solvent Cements Including Various Concentrations of Co-Solvents In this Example, the relative performance of PVC solvent cements and CPVC solvent cements including A6-3 and various concentrations of cyclohexanone and acetone, is demonstrated. The PVC solvent cements were prepared by adding 12.0 wt. % of PVC resin to solvent mixtures including THF or A6-3, as described above in reference to Example 5. The CPVC solvent cements were prepared by adding 14.0 wt. % of CPVC resin to solvent mixtures including THF or A6-3, as described above in reference to Example 6. A total of four solvent cements were produced, as shown in Table 11 below. Solvent cements 11 and 24 from Examples 5 and 6, respectively, are included for comparison.

The viscosity of each of the PVC and CPVC solvent cements was measured as described above for Example 5. The volatile organic content (VOC) was determined for each of the PVC and CPVC solvent cements as described above for Example 5. The viscosity and VOC results are shown in Table 11. As shown in Table 11, the viscosity of the solvent cements decreased with increasing concentrations of cyclohexanone and VOC increased.

TABLE 11

| Cement | Solvent | Cyclohexanone | Acetone | MEK | Resin | Viscosity (cP) | VOC (g/L) |
|---|---|---|---|---|---|---|---|
| 11 | Sol-3 (10%) | 15% | 45% | 18% | PVC (12%) | 568 | 287 |
| 30 | Sol-3 (10%) | 25% | 35% | 18% | PVC 12% | 632 | 383 |
| 31 | Sol-3 (10%) | 30% | 30% | 18% | PVC 12% | 259 | 430 |
| 24 | Sol-3 (10%) | 15% | 43% | 18% | CPVC 14% | 1085 | 290 |
| 32 | Sol-3 (10%) | 25% | 33% | 18% | CPVC 14% | 866 | 387 |
| 33 | Sol-3 (10%) | 35% | 28% | 18% | CPVC 14% | 474 | 449 |

Figure 6:
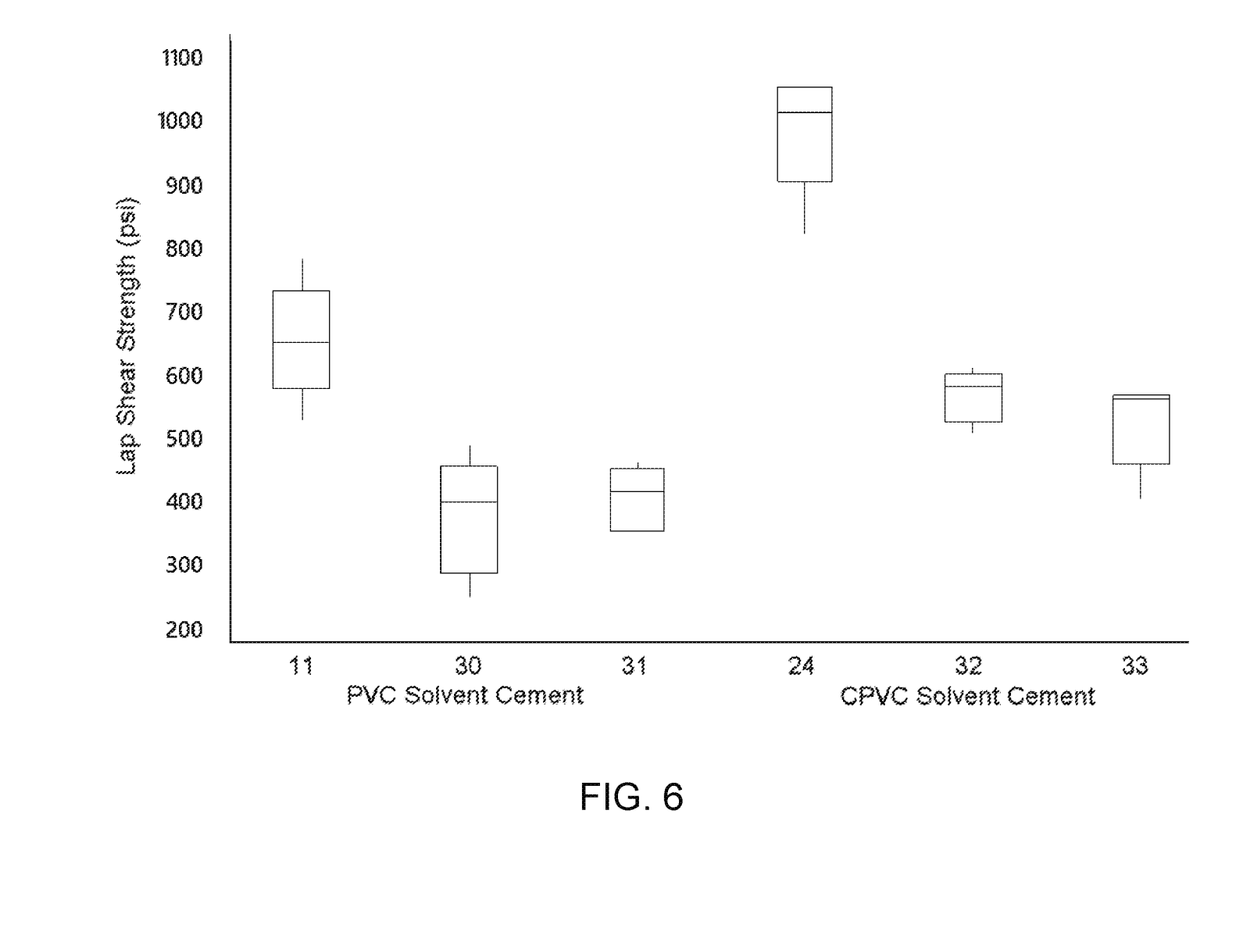
FIG. 6 is a box plot of lap shear strengths for PVC solvent cements and CPVC solvent cements including A6-3 and various concentrations of cyclohexanone and acetone seventy-two hours after bonding, according to this disclosure.

Lap shear test samples were prepared and tested as described above in Example 5. The results for each PVC and CPVC solvent cement are shown in Table 12 below. Surprisingly, the increasing the concentration of cyclohexanone tended to reduce the lap shear strength after seventy-two hours, as shown in FIG. 6.

TABLE 12

| | | Lap Shear (psi) | | |
|---|---|---|---|---|
| Cement | Solvent | After 2 hours | After 16 hours | After 72 hours |
| 11 | Sol-3 (10%) | 171 ± 33 | 472 ± 45 | 656 ± 93 |
| 30 | Sol-3 (10%) | 229 ± 56 | 372 ± 46 | 378 ± 91 |
| 31 | Sol-3 (10%) | 191 ± 75 | 322 ± 19 | 406 ± 51 |
| 24 | Sol-3 (10%) | 284 ± 42 | 467 ± 101 | 988 ± 97 |
| 32 | Sol-3 (10%) | 245 ± 19 | 510 ± 85 | 568 ± 41 |
| 33 | Sol-3 (10%) | 194 ± 14 | 573 ± 46 | 523 ± 71 |

What is claimed is:
1. A solvent cement comprising:
an N-ethylcaprolactam solvent;
one or more co-solvents consisting of acetone, methyl ethyl ketone, cyclohexanone, or combinations thereof; and a polymer selected from the group of polyvinyl chloride and chlorinated polyvinyl chloride, the polymer in solution with the one N-ethylcaprolactam solvent and the one or more co-solvents.

2. The solvent cement of claim 1, wherein the polymer consists of polyvinyl chloride.

3. The solvent cement of claim 1, wherein the polymer consists of chlorinated polyvinyl chloride.

4. The solvent cement of claim 1, wherein the polymer is 1 wt. % to 30 wt. % of the solvent cement.

5. The solvent cement of claim 1, wherein a concentration of the N-ethylcaprolactam solvent is 70 wt. %-99 wt. % of the solvent cement.

6. The solvent cement of claim 1, wherein a concentration of the N-ethylcaprolactam solvent is 5 wt. % to 94 wt. % of the solvent cement and a concentration of the one or more co-solvents is 5 wt. % to 85 wt. % of the solvent cement.

7. A method of producing a solvent cement, the method comprising:

providing a polymer selected from the group consisting of polyvinyl chloride and chlorinated polyvinyl chloride;

providing an N-ethylcaprolactam solvent;

providing one or more co-solvents consisting of acetone, methyl ethyl ketone, cyclohexanone, or any combinations thereof; and mixing the polymer, the N-ethylcaprolactam solvent, and the one or more co-solvents until the polymer is in solution with the N-ethylcaprolactam solvent and the one or more co-solvents to produce the solvent cement.

8. A composition for forming a polymer coating on an object, the composition comprising:

a polymer selected from the group of polyvinyl chloride and chlorinated polyvinyl chloride;

an N-ethylcaprolactam solvent; and one or more co-solvents consisting of acetone, methyl ethyl ketone, cyclohexanone, or any combination thereof, wherein a portion of the polymer is suspended in the composition.

9. The composition of claim 8, wherein the polymer is 25 wt. % to 45 wt. % of the composition.

* * * * *